(12) United States Patent
Werder et al.

(10) Patent No.: US 8,468,922 B2
(45) Date of Patent: Jun. 25, 2013

(54) RAIL-GUIDED POWER TOOL

(75) Inventors: Bruno Werder, Gamprin (LI); Michael Selb, Feldkirch (AT); Josef Schittl, Thueringen (AT)

(73) Assignee: Hilti Aktiengesellschaft, Schaan (LI)

( * ) Notice: Subject to any disclaimer, the term of this patent is extended or adjusted under 35 U.S.C. 154(b) by 602 days.

(21) Appl. No.: 12/802,182

(22) Filed: Jun. 1, 2010

(65) Prior Publication Data

US 2010/0300258 A1   Dec. 2, 2010

(30) Foreign Application Priority Data

Jun. 2, 2009   (DE) .................. 10 2009 026 637

(51) Int. Cl.
*B26D 1/18*   (2006.01)
(52) U.S. Cl.
USPC .............................................. 83/486; 83/483
(58) Field of Classification Search
USPC ................ 83/373, 399, 508.1, 483, 485, 486, 83/698.11
See application file for complete search history.

(56) References Cited

U.S. PATENT DOCUMENTS

| 149,409 | A | * | 4/1874 | Lumbert ...................... 83/471.3 |
| 1,699,582 | A | * | 1/1929 | Breidenbach ................... 83/486 |
| 3,552,805 | A | | 1/1971 | Dunlap |
| 3,866,496 | A | * | 2/1975 | Payne et al. .................. 83/471.3 |
| 3,955,456 | A | * | 5/1976 | Van Cleave ................... 83/471.3 |
| 5,588,418 | A | | 12/1996 | Holmes et al. ............. 125/13.01 |
| 6,843,328 | B2 | | 1/2005 | Boyl-Davis et al. |
| 2004/0175247 | A1 | | 9/2004 | VanderPol et al. ............ 490/132 |
| 2007/0163412 | A1 | | 7/2007 | Baratta et al. ................... 83/651 |

FOREIGN PATENT DOCUMENTS

| DE | 10 2004 014 837 B3 | 5/2005 |
| DE | 602 09 039 T2 | 8/2006 |
| EP | 1 579 968 | 9/2005 |
| WO | WO 9622865 A2 | 8/1996 |

* cited by examiner

*Primary Examiner* — Sean Michalski
(74) *Attorney, Agent, or Firm* — Davidson, Davidson & Kappel, LLC

(57) ABSTRACT

A rail-guided power tool (1) has at least one carrying handle (24) and one device head (2) arranged on a guide carriage (12). The guide carriage (12) can be moved by an adjustment mechanism (23) from a locked position—in which the guide carriage (12) is engaged with a guide rail (9) via at least one adjustable guide roller (22)—into a released position—in which the at least one adjustable guide roller (22) is at a distance from the guide rail (9). The power tool (1) also has an unlocking mechanism (25) including an actuator (30), a transmitter (31) and an unlocking device (32), whereby the unlocking mechanism (25) is configured in one piece.

8 Claims, 4 Drawing Sheets

RAIL-GUIDED POWER TOOL

This claims the benefit of German Patent Application DE 10 2009 026 637.2, filed Jun. 2, 2009 and hereby incorporated by reference herein.

The present invention relates to a rail-guided power tool.

BACKGROUND

Wall saws are sawing devices for cutting reinforced or non-reinforced walls, ceilings and floors made of concrete or a similar material using rotating saw blades fitted with cutting segments. They are used in building construction and civil engineering, as well as for restoration and renovation work. For example, in the case of demolition or rebuilding work, it can be necessary to cut or remove already existing concrete walls, or else to cut out parts of such walls.

EP 1 579 968 B1 discloses a rail-guided power tool, for example, a sawing, slitting or drilling tool, with a tool unit arranged on a guide carriage and with a carrying handle. The guide carriage engages with a guide rail via guide rollers, whereby the guide rollers can be moved from a locked position into a released position by means of an adjustment mechanism located in the carrying handle. The carrying handle has an unlocking mechanism that, in the locked position, prevents the accidental actuation of the adjustment mechanism. The unlocking mechanism comprises an actuation means that can be rotated around an axis of the carrying handle, a transmission means and an unlocking means. The rotational movement of the actuation means can be transmitted to the unlocking means via the transmission means.

It is a drawback that the unlocking means consists of multiple parts. Moreover, the actuation means of the unlocking mechanism is quite difficult to actuate with the thumb when the user is gripping the carrying handle.

SUMMARY OF THE INVENTION

It is an object of the present invention to simplify the unlocking of the guide carriage. Additionally, the unlocking mechanism should be easy to operate, even when the user is firmly gripping the carrying handle.

The present invention provides a rail-guided power tool that has at least one carrying handle and one device head arranged on a guide carriage. The guide carriage can be moved by means of an adjustment mechanism from a locked position—in which the guide carriage is engaged with a guide rail via at least one adjustable guide roller—into a released position—in which the at least one adjustable guide roller is at a distance from the guide rail. The power tool also has an unlocking mechanism with an actuation means, a transmission means and an unlocking means. Here, the unlocking mechanism is configured in one piece.

The number of parts needed is reduced because of the one-piece configuration of the unlocking mechanism comprising the actuation means, the transmission means and the unlocking means. On the one hand, this reduces the costs for the unlocking mechanism, and on the other hand, the unlocking mechanism is sturdier and less prone to failure.

Preferably, the unlocking mechanism is configured as a metal part. A metal part entails the advantage that it is simple and inexpensive to produce. Furthermore, it is sturdy and easy to replace.

According to another aspect, the actuation means of the unlocking mechanism is pre-tensioned in the locked position by means of a spring element. Here, the spring element is especially preferably integrated into the one-piece unlocking mechanism. During the unlocking procedure, the pre-tensioning of the spring element first has to be overcome before the actuation means is moved, so as to reduce the risk of accidental unlocking.

According to another aspect, the at least one adjustable guide roller is arranged in the locked position in such a way that the dead center position is passed. The self-locking in the locked position prevents the guide carriage from accidentally separating from the guide rail due to the forces that are active.

According to another aspect, in the locked position, the at least one adjustable guide roller has a setting mechanism for setting the play between the at least one guide roller and the guide rail. Using the setting mechanism, the guide carriage can be arranged on the guide rail without play, without jamming.

In a preferred embodiment, the adjustment mechanism has a slide rod that is coupled via a coupling element to the carrying handle. Here, the slide rod especially preferably has at least one guide element that is coupled to at least one adjustable guide roller.

Additional advantages and advantageous embodiments of the subject matter of the invention can be gleaned from the description, the drawing and the claims. By the same token, the features according to the invention that are mentioned above as well as below can each be used individually or together in any desired combination. The embodiments shown and described are not to be understood as a complete listing but rather they have the character of examples describing the invention.

BRIEF DESCRIPTION OF THE DRAWINGS

The following is shown.

DETAILED DESCRIPTION

Figure 1:
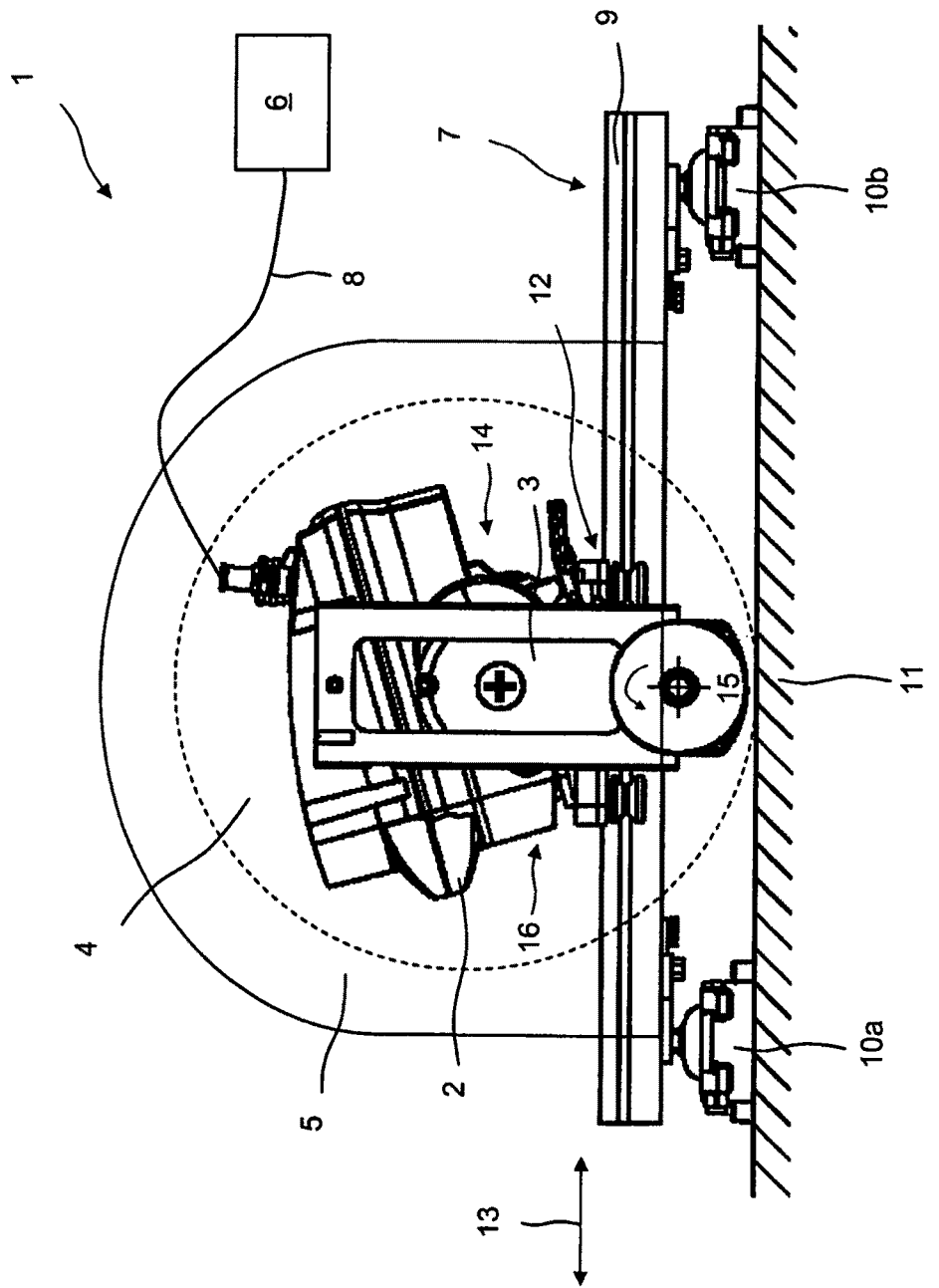
FIG. 1—a side view of a rail-guided wall saw according to the invention attached to the floor.

Unless otherwise indicated, identical or functionally equivalent elements are designated by the same reference numerals in the figures.

The rail-guided power tool 1 according to the invention shown in FIG. 1 is configured as a wall saw. The wall saw 1 comprises a saw head 2, a saw arm 3 with a saw blade 4 and a saw blade guard 5, an operating mechanism 6 and an attachment device 7 for attaching the wall saw 1. The wall saw 1 is operated by means of the operating mechanism 6 that is joined to the saw head 2 via a supply line 8. The wall saw 1 is attached to the attachment device 7, which consists of a guide rail 9 and rail feet 10a, 10b on the floor 11.

The saw head 2 is arranged so as to be moveable lengthwise over a guide carriage 12 on the guide rail 9 in the direction of an axis 13. The saw head 2 comprises a first drive mechanism 14 for rotating the saw blade 4 around an axis of rotation 15, and a second drive mechanism 16 for controlling the advance of the guide carriage 12 along the guide rail 9 in the direction of the axis 13. As an alternative, the drive mechanisms for rotating the saw blade 4 and for controlling the advance of the guide carriage 12 can be configured as a shared drive mechanism.

Figure 2:
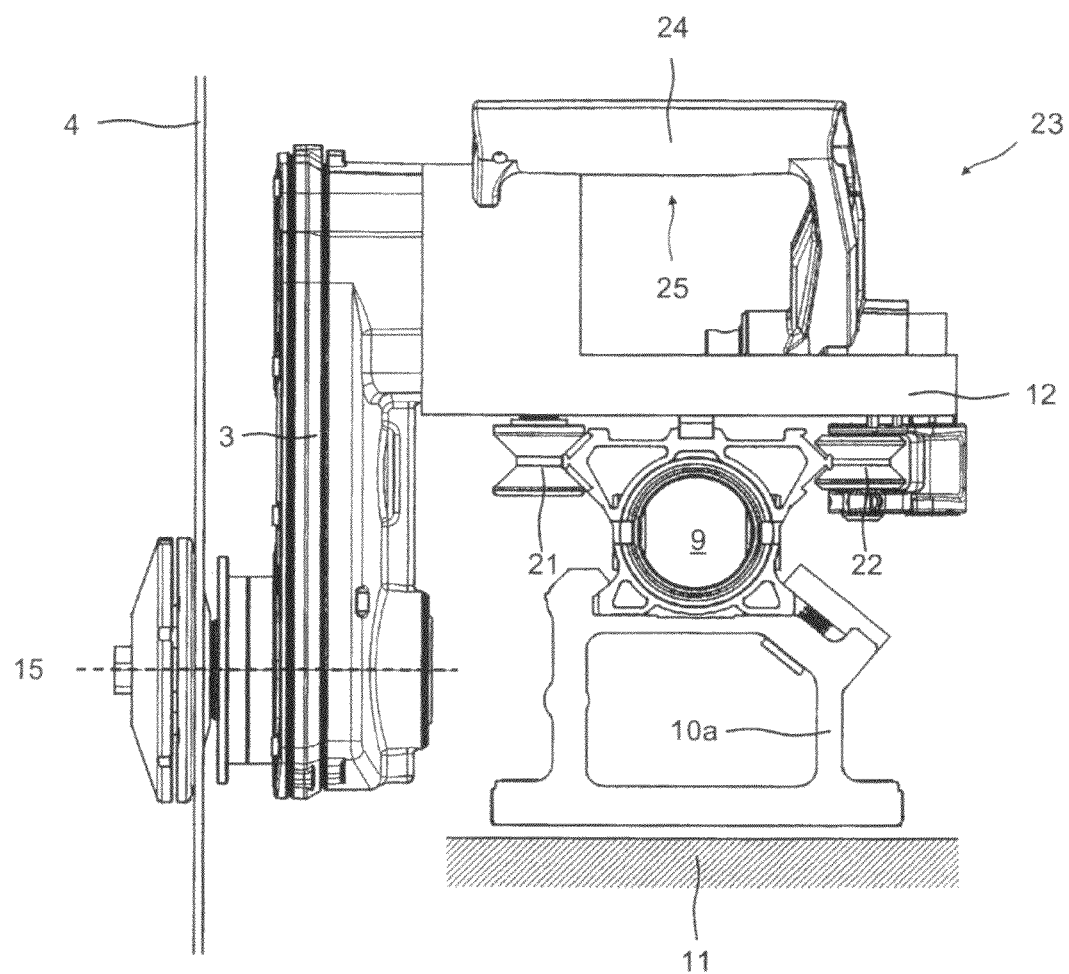
FIG. 2—a section through a guide carriage according to the invention, with a carrying handle and an adjustment mechanism.

FIG. 2 shows a section through the guide carriage 12 that is engaged with the guide rail 9 by two rigid guide rollers 21 and two adjustable guide rollers 22, whereby only one of them is shown in each case in FIG. 2. The adjustable guide rollers 22 can be moved from a locked position into a released position by means of an adjustment mechanism 23. In the locked position, the rigid guide rollers 21 as well as the adjustable guide rollers 22 are engaged with the guide rail 9. In the released position, at least the adjustable guide rollers 22 are at a distance from the guide rail 9, and the wall saw 1 can be positioned at a distance from the guide rail 9 or, when assembled, can be positioned on the guide rail 9.

The guide carriage 12 has a carrying handle 24. The adjustment mechanism 23 is actuated by means of the carrying handle 24. The carrying handle 24 has an unlocking mechanism 25 that, in the locked position, prevents the accidental actuation of the adjustment mechanism.

Figure 3A:
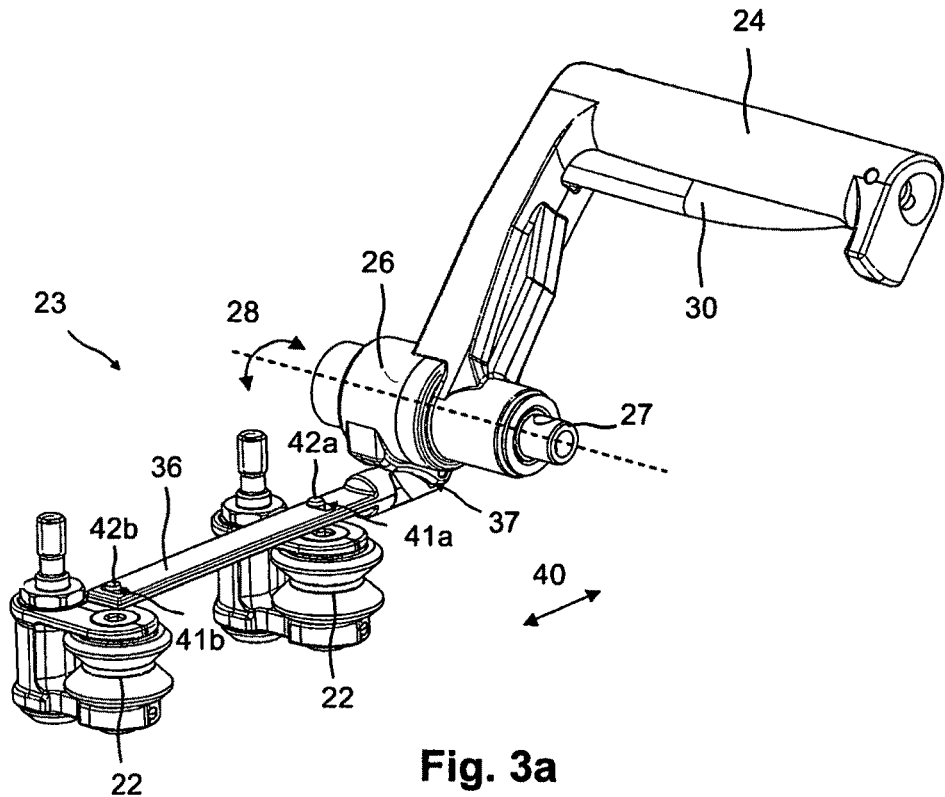
FIGS. 3a,b—a section of the guide carriage of FIG. 2 with the adjustment mechanism (FIG. 3a) and an unlocking mechanism (FIG. 3b) arranged in the carrying handle.

FIGS. 3a,b show the carrying handle 24 of the guide carriage 12 with the adjustment mechanism 23 and with the unlocking mechanism 25 that is arranged in the carrying handle 24.

FIG. 3a shows the carrying handle 24 that is non-rotatably coupled to a transmission element 26 in the form of a connecting link. The connecting link 26 is arranged on an axis 27 and configured so as to be rotatable around the axis 27 in the direction indicated by the arrow 28.

Figure 3B:
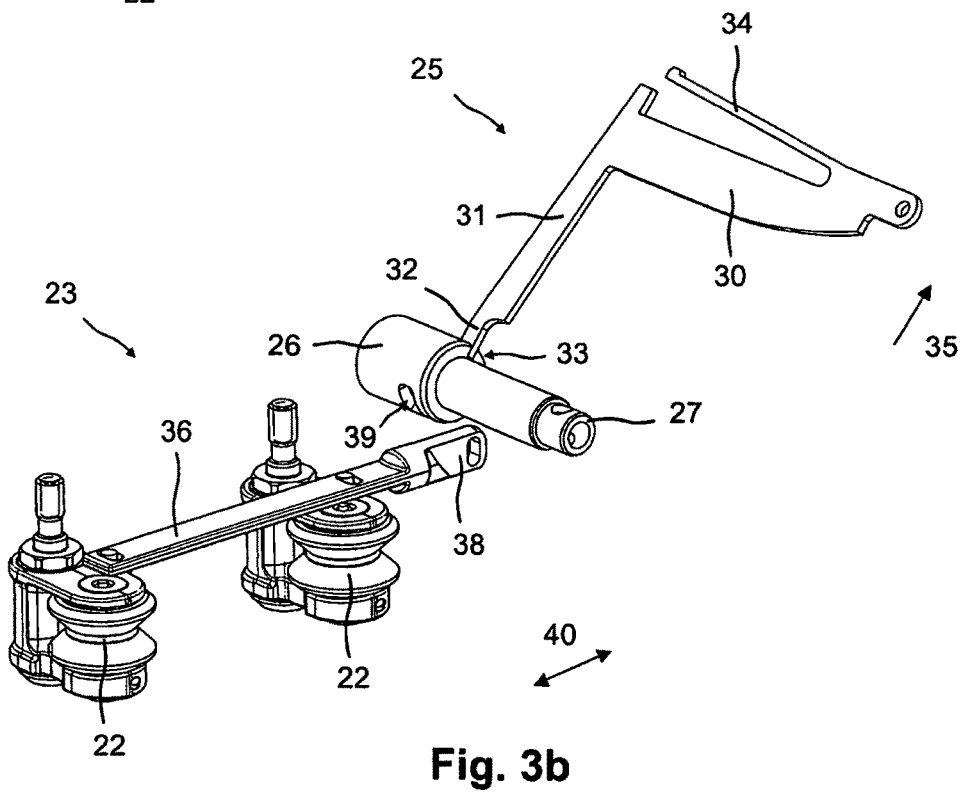

FIG. 3b shows the unlocking mechanism 25 arranged inside the carrying handle 24. The unlocking mechanism 25 comprises an actuator or actuation means 30, a transmitter or transmission means 31 and an unlocking means or device 32. A movement of the actuation means 30 is transmitted to the unlocking means 32 via the transmission means 31. The unlocking means 32 is configured as a slide that interacts with a recess 33 in the connecting link 26. The unlocking mechanism 25 is configured in one piece as a metal part. The number of parts needed is reduced because of the one-piece configuration of the unlocking mechanism comprising the actuation means, the transmission means and the unlocking means. A one-piece metal part is simple and inexpensive to produce, and furthermore, it is sturdy and not prone to failure.

The actuation means 30 is simple to operate when the carrying handle 24 is gripped with one's hand, so that safe handling is ensured. The actuation means 30 can be actuated while the fingers securely grip around the carrying handle 24. In order to make an accidental unlocking of the carrying handle 24 more difficult, the unlocking mechanism 25 arranged in the carrying handle 24 has a spring element 34. During the unlocking procedure, the pre-tensioning of the spring element 34 first has to be overcome before the actuation means 30 can be moved.

In order to unlock the carrying handle 24, the actuation means 30 has to be pulled in the direction 35 to such an extent that the unlocking means 32 can slide out of the recess 33 and the locking of the carrying handle 24 is eliminated. After the unlocking, the carrying handle 24 can be rotated around the axis 27 in the direction 28. As an alternative, the unlocking mechanism 25 can also be configured in such a way that the actuation means 30 can be moved by pushing, not by pulling.

The adjustment mechanism 23 comprises a slide rod 36 that is coupled to the connecting link 26 via a coupling element 37. The coupling element 37 consists of a guide element 38 that engages into a slit-shaped recess 39 in the connecting link 26. A rotational movement of the carrying handle 24 around the axis 27 is converted via the connecting link 26 into a movement of the slide rod 36 in the direction of the axis 40.

The slide rod 36 is coupled to the adjustable guide rollers 22 and it comprises two guide elements 41a, 41b that are configured as elongated holes and that interact with a pin 42a, 42b of the adjustable guide rollers 22.

Figure 4A:
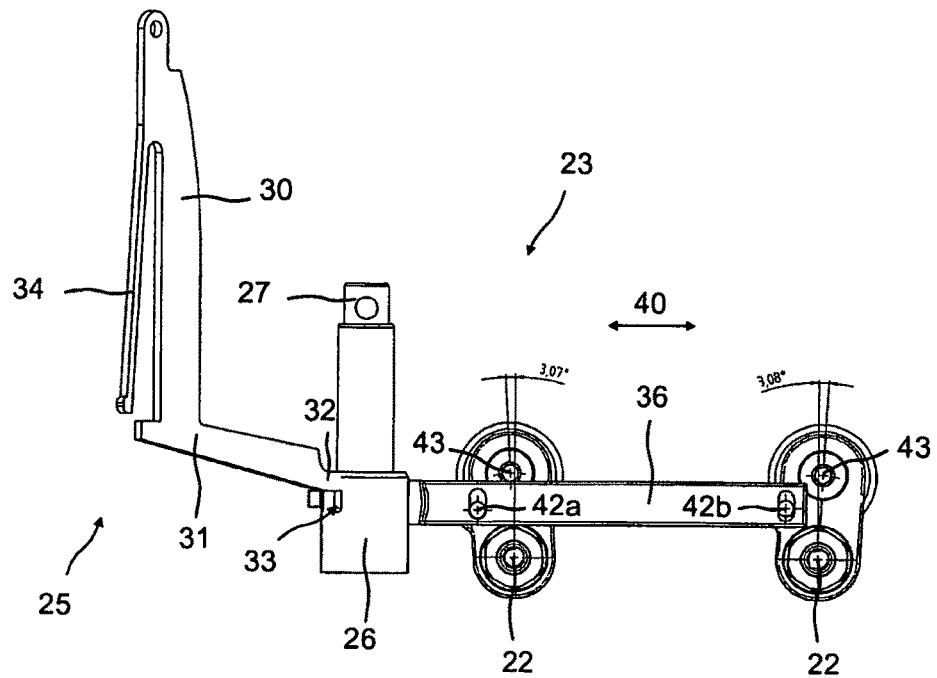
FIGS. 4a,b—the adjustment and unlocking mechanisms of the guide carriage of FIG. 2 in a view from the top in a locked position (FIG. 4a) and in a released position (FIG. 4b).
Figure 4B:
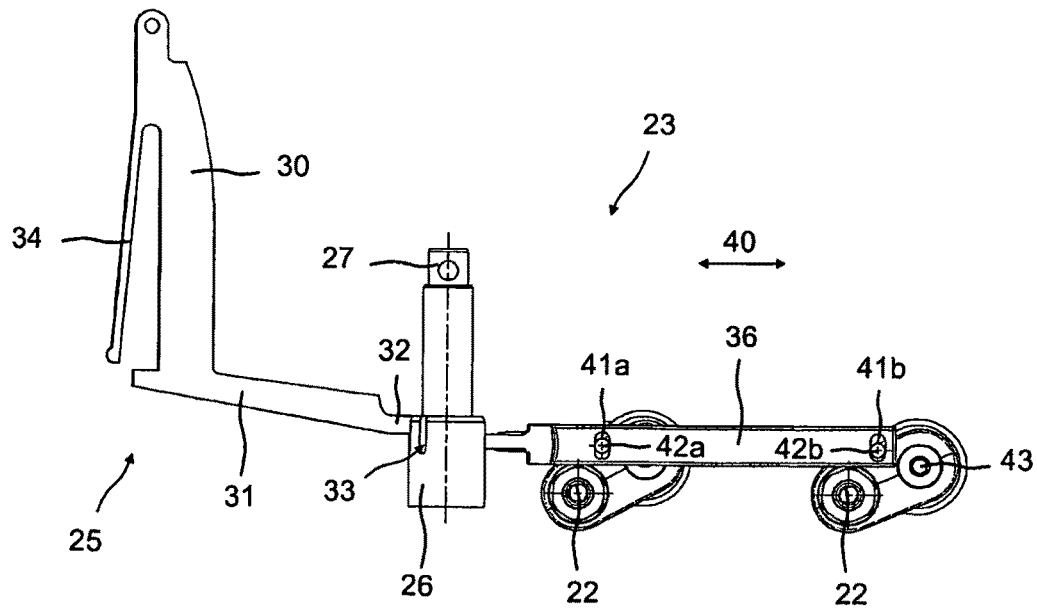

FIGS. 4a,b show the adjustment and unlocking mechanisms 23, 25 of the guide carriage of FIG. 2 in a top view, whereby the adjustment mechanism 23 is arranged in the locked position in FIG. 4a, and in the released position in FIG. 4b.

The movement of the slide rod 36 in the direction 40 is converted into a pivoting movement of the adjustable guide rollers 22 around rotational axes that are parallel to each other. The adjustable guide rollers 22 are moved from the locked position, in which the adjustable guide rollers 22 are engaged with the guide rail 9 (FIG. 4a), into the released position, in which the adjustable guide rollers 22 are at a distance from the guide rail 9 (FIG. 4b).

In the locked position, the adjustable guide rollers 22 are arranged in such a way that the dead center position is passed by a certain value. By passing the dead center position, a secure attachment of the guide carriage 12 and thus of the wall saw 1 on the guide rail 9 is ensured. The passing of the dead center position is referred to as self-locking or self-holding.

In the locked position, the adjustable guide rollers 22 have a setting device 43 in the form of a cam for setting the play between the guide rollers 22 and the guide rail 9. Using the setting device 43, the play of the adjustable guide rollers 22 is set in such a way that the guide carriage 12 is arranged on the guide rail without play, without jamming.

What is claimed is:

1. A rail-guided power tool comprising:
   a guide carriage;
   at least one carrying handle and one device head arranged on the guide carriage, the guide carriage movable by an adjustment mechanism from a locked position to a released position, the guide carriage being engaged with a guide rail via at least one adjustable guide roller in the locked position and the at least one adjustable guide roller being at a distance from the guide rail in the released position; and
   an unlocking mechanism comprising an actuator, a transmitter and an unlocking device, the unlocking mechanism being formed as one piece.

2. The power tool as recited in claim 1 wherein the unlocking mechanism is a single metal part.

3. The power tool as recited in claim 1 wherein the actuator is pre-tensioned in the locked position by a spring element.

4. The power tool as recited in claim 3 wherein the spring element is integrated into the one-piece unlocking mechanism.

5. The power tool as recited in claim 1 wherein the at least one adjustable guide roller is arranged in the locked position in such a way that a dead center position is passed.

6. The power tool as recited in claim 1 wherein, in the locked position, the at least one adjustable guide roller has a setting mechanism for setting the play between the at least one guide roller and the guide rail.

7. The power tool as recited in claim 1 wherein the adjustment mechanism has a slide rod coupled via a coupling element to the carrying handle.

8. The power tool according to claim 7 wherein the slide rod has at least one guide element coupled to the at least one adjustable guide roller.

* * * * *